(12) United States Patent
Lu

(10) Patent No.: US 7,147,584 B1
(45) Date of Patent: Dec. 12, 2006

(54) LOCKING GEAR FOR A DIFFERENTIAL DEVICE

(75) Inventor: Tai-Yang Lu, Taiping (TW)

(73) Assignee: Taiwan Jet Power Industrial Ltd., Taiping (TW)

( * ) Notice: Subject to any disclaimer, the term of this patent is extended or adjusted under 35 U.S.C. 154(b) by 145 days.

(21) Appl. No.: 11/027,197

(22) Filed: Jan. 3, 2005

(51) Int. Cl.
*F16H 48/06* (2006.01)
(52) U.S. Cl. .................................................. 475/250
(58) Field of Classification Search ............... 192/69.5, 192/93 C, 71; 475/250
See application file for complete search history.

(56) References Cited

U.S. PATENT DOCUMENTS 5,156,247 A * 10/1992 Wiese et al. ............... 192/48.2

* cited by examiner

*Primary Examiner*—Dirk Wright
(74) *Attorney, Agent, or Firm*—Egbert Law Offices

(57) ABSTRACT

A locking gear is a differential device configured between the main flywheel that is attached with a differential and one end of a spindle. The locking gear includes a protruded annulet that is configured at the outside of the main flywheel, and several radial through holes on the protruded annulet, and several grooves configured at one end of the spindle that will aim at each radial through hole on the protruded annulet respectively when the spindle rotates to a predetermined angle, and beads that are placed in each radial through hole. Also, there is a clutch body that sleeves one end of the spindle, and the end of its central through hole forms a small expansion section and a large expansion section, and the aperture of the small expansion section right gears the outside diameter of the protruded annulet, therefore the beads can be fixed internally.

2 Claims, 3 Drawing Sheets

US 7,147,584 B1

LOCKING GEAR FOR A DIFFERENTIAL DEVICE

FIELD OF THE INVENTION

The present invention relates generally to a differential device, and more particularly to an innovative locking design that is composed of a differential main wheel having radial through holes, a spindle at which grooves are formed, and a separately made cylinder-type clutch body.

BACKGROUND OF THE INVENTION

A differential device, being generally referred to as the differential gear, is widely used in the transmission structure of a vehicle wheel. When a vehicle is turning aside, due to different moving distances between the left and right wheels, the turning cycles of both left and right wheels vary, during which, the moving in reverse directions, i.e. differential speed, of both left and right wheels can be achieved through the setting of a differential device. During the using of the differential, as a switching between the same and reverse direction rotation modes of two spindles in the same axis is concerned, the working status of the differential must be switched by means of a locking gear. Currently, a majority of differentials apply an electromagnetic clutch device as a locking and spindle release means. However, it is found in the widespread application of the electromagnetic clutch device that the authenticity of its action for locking and release is always under the influence of an unstable electromagnetic force. For locking status, the severe problems such as insufficient stability even disengagement are more likely to arise. Based on this, although mechanical differential devices are developed by those in the art so as to eliminate aforesaid defects, most of the devices are not practical due to excessively complicated structure, high cost and inconvenient maintenance.

Hence, to the above description, how to develop a practical and usable differential still needs further thinking and breaking through.

Therefore, aiming at aforementioned object, and after detailed design and careful estimation, a real practical invention is achieved by the inventor according to his years of experience in the making, design and development of related products.

BRIEF SUMMARY OF THE INVENTION

The differential device is composed of the protruded annulet 13 having radial through holes, the spindle 20 at which grooves 21 are formed, and a cylinder-type clutch body 40. It has very simple construction, thus can be easily made at a lower cost, and preferably suitable for industrial mass production.

As an innovative design that uses beads 30 to achieve locking and release, it fully applies mechanical action in working, and can achieve, as practical improvement, especially stable and firm locking and is more durable.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
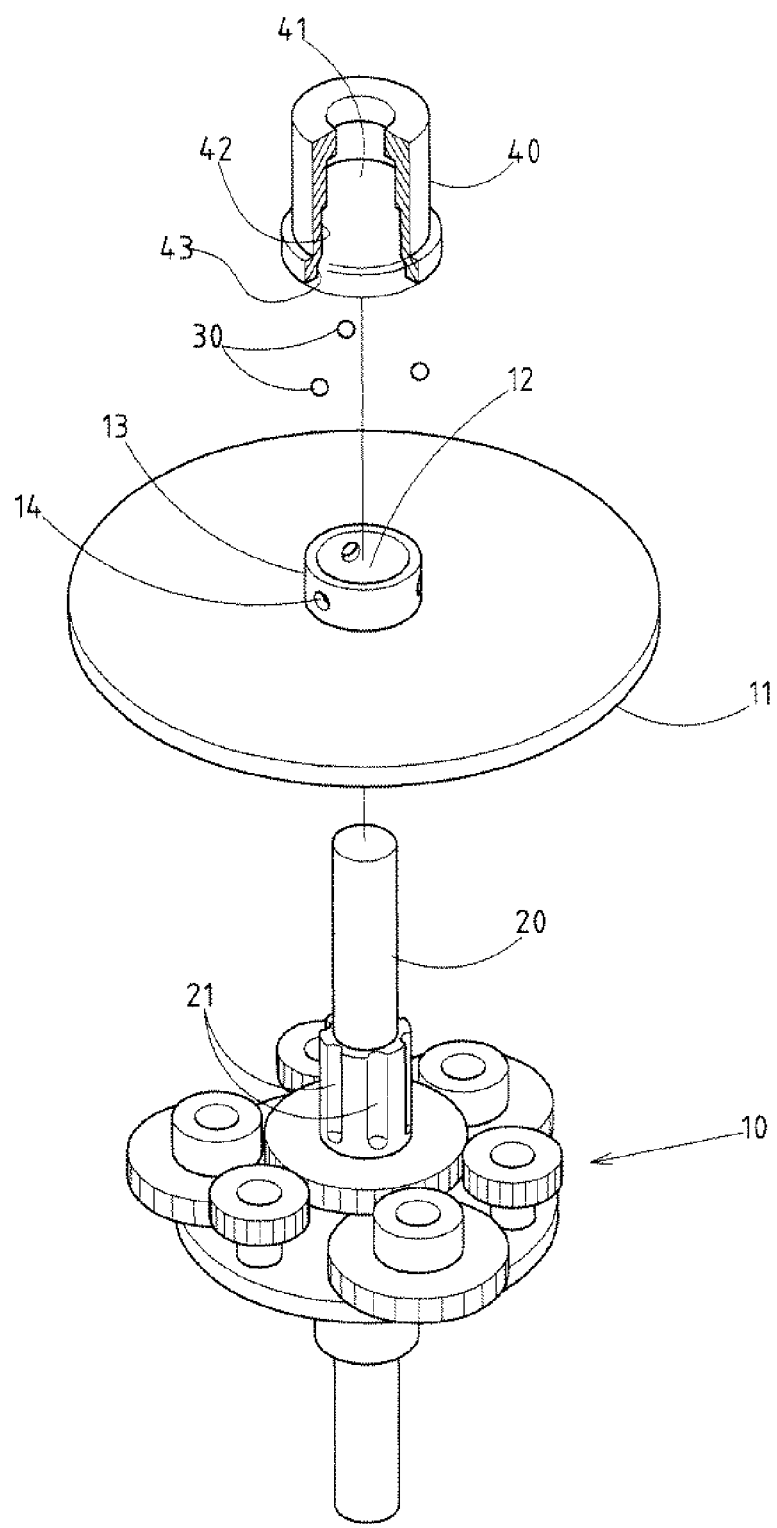
FIG. 1 shows a perspective view of the present invention.
Figure 2:
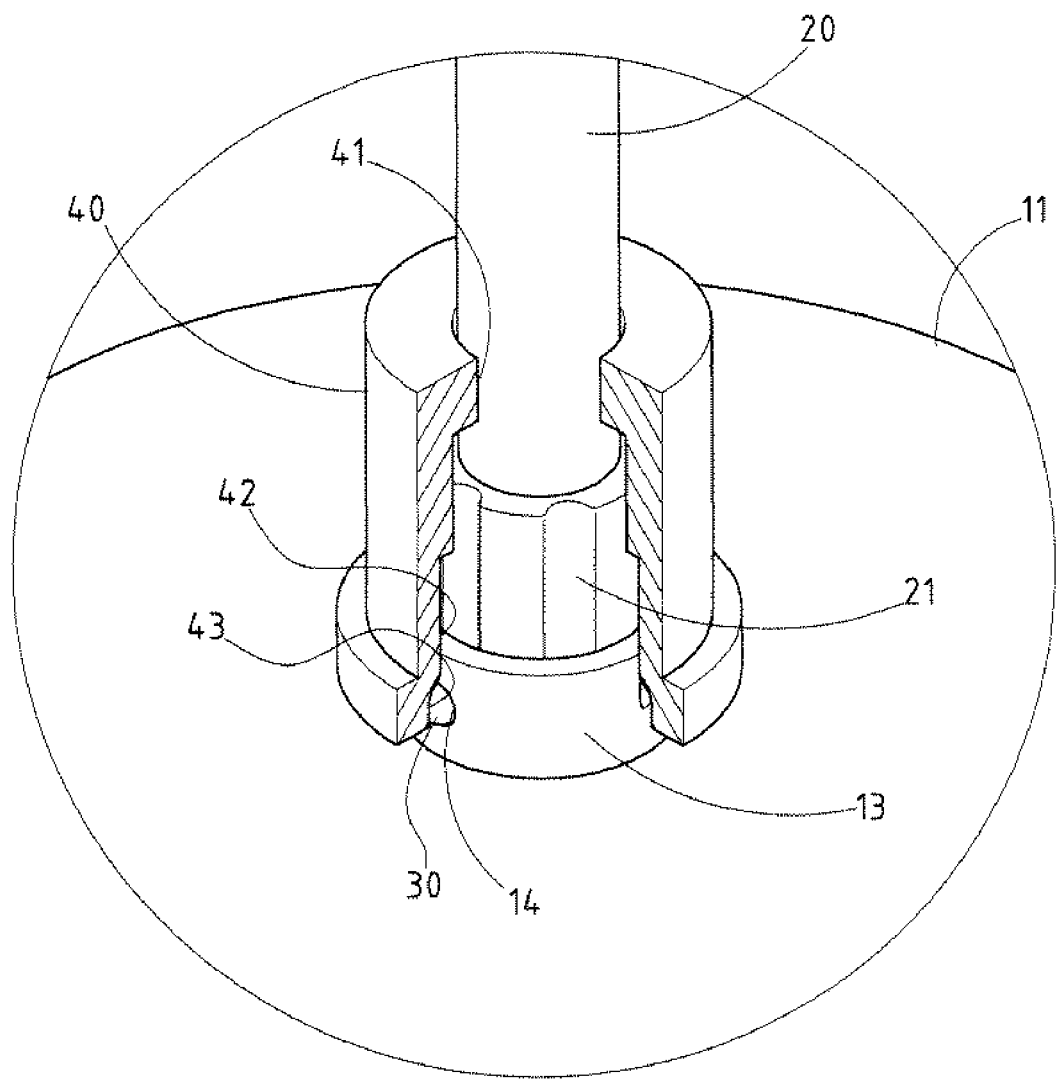
FIG. 2 shows a partial magnified perspective and partial sectional view of the present invention.
Figure 3:
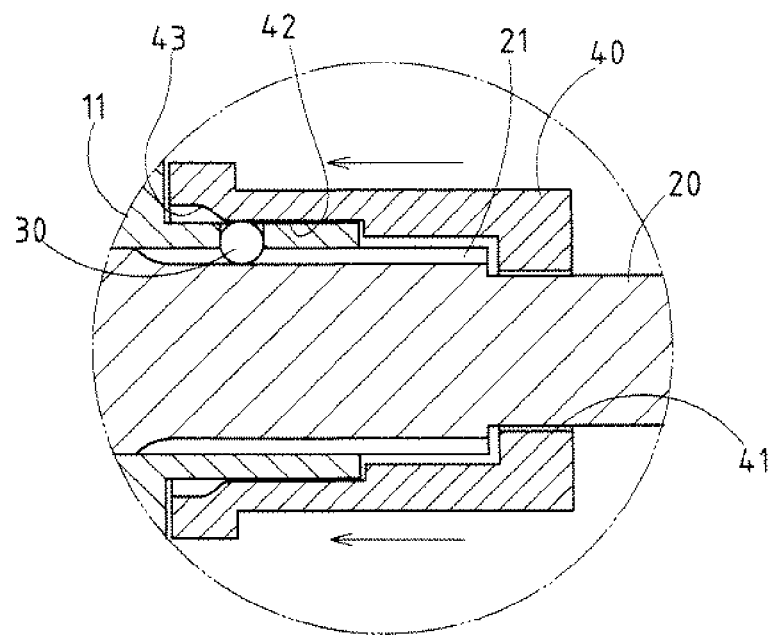
FIG. 3 shows a partial cross-sectional view of the spindle at a locking position.

As shown in FIGS. 1–3, there is a locking gear for the differential mechanism embodied in the present invention.

The differential device is configured between the main flywheel 11 that is attached with a differential 10 and one end of the spindle 20, wherein one end of spindle 20 passes through the outside of the central through hole 12 that is set for the main flywheel 11.

The invention has a protruded annulet 13, being configured at the outside of the central through hole 12 of the main flywheel 11.

There are several radial through holes 14, being arranged on aforesaid protruded annulet 13 at an interval.

There are also several grooves 21, being formed surrounding one end of the spindle 20 at an interval. The grooves are strip-type that can extend axially, and the grooves will aim at each radial through hole 14 on the protruded annulet 13 respectively when the spindle 20 rotates to a predetermined angle.

Figure 4:
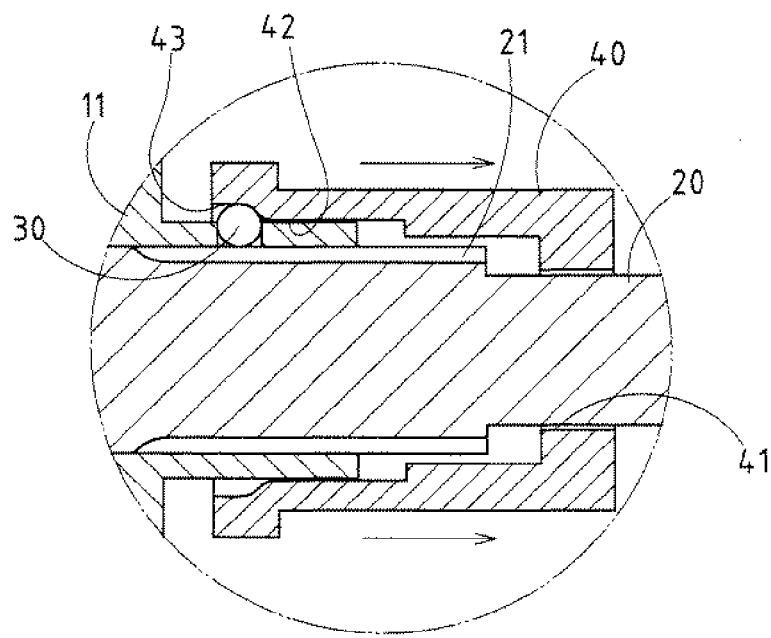
FIG. 4 shows a partial cross-sectional view of the spindle at a released position.

The invention further includes beads 30, being placed in each radial through hole 14. The beads will get into the grooves when the radial through holes 14 aim at the grooves 21 of the spindle 20, thus form the status that beads 30 are at the same time in the radial through holes 14 and the grooves and the spindle 20 is locked (as shown in FIG. 3); contrarily, when beads 30 are moved outward to entirely disengage grooves 21, the constituent spindle 20 is in a released status (as shown in FIG. 4).

There is a clutch body 40, which is in cylinder shape. It sleeves one end of the spindle 20 and can move forward and backward axially under the driven of a predetermined transmission device, and the end of its central through hole 41 that faces the main flywheel forms from interior to exterior a small expansion section 42 and a large expansion section 43 in sequence, wherein, the aperture of the small expansion section 42 right gears the outside diameter of the protruded annulet 13, and therefore the beads 30 can be fixed internally when the small expansion section 42 aims at the perimeter of the radial through holes 14 of the protruded annulet 13. The aperture of the large expansion section 43 must be larger than that of the small expansion section 42 and be used as a limit circle when beads 30 are moved outward to disengage grooves 21.

According to aforesaid design of constituents, the working principle of the differential device of the invention is as follows.

As shown in FIG. 3 that indicates the status of locking of the spindle 20, when the clutch body 40 moves toward the protruded annulet 13 of the main flywheel 11 under the driven of a predetermined transmission device, the small expansion section 42 of the clutch body 40 will sleeve around the protruded annulet 13 so as to internally fix the beads 30 can be fixed and form the status that beads 30 are at the same time in the radial through holes 14 and the grooves, and the spindle 20 is locked.

As shown in FIG. 4 that indicates the status of release of the spindle 20, when the clutch body 40 moves away from the main flywheel 11 under the driven of a predetermined transmission device and to the preset stop position, the bigger expansion section 43 of the clutch body 40 will match the perimeter of the radial through holes of the protruded annulet 13. In this status, the beads 30 will not fix the spindle 20 due to the existence of outward moving space when the spindle 20 rotates, which then forms the released status of the spindle.

I claim:

1. A locking gear for a differential device configured between a main flywheel a differential and one end of a spindle, one end of said spindle passing through an outside of a central through hole set for the main flywheel, said locking gear comprising:

a protruded annulet, being configured at the outside of the central through hole of the main flywheel;

a plurality of radial through holes, being arranged on said protruded annulet at an interval;

a plurality of grooves, being formed surrounding one end of the spindle at an interval, said grooves aiming at each radial through hole on the protruded annulet respectively when the spindle rotates to a predetermined angle;

a plurality of beads, being placed in each radial through hole, said beads engaging into the grooves when the radial through holes aim at the grooves of the spindle, having a locking status when beads are at the same time in the radial through holes and the grooves, and the spindle is locked; and a clutch body being a cylinder type and sleeving one end of the spindle, and being axially movable, an end of a central through hole thereof that faces the main flywheel forms from interior to exterior a small expansion section and a large expansion section in sequence, wherein, the aperture of the small expansion section right gears the outside diameter of the protruded annulet, and therefore the beads can be fixed internally when the small expansion section aims at the perimeter of the radial through holes of the protruded annulet, and the aperture of the large expansion section must be larger than that of the small expansion section and be used as a limit circle when beads are moved outward to disengage the grooves.

2. The locking gear defined in claim 1, wherein said grooves formed on the spindle are in a strip-type that can axially extend.

* * * * *